(12) United States Patent
Kisaka

(10) Patent No.: US 7,006,321 B2
(45) Date of Patent: Feb. 28, 2006

(54) DATA STORAGE APPARATUS, ROTATION CONTROL APPARATUS, AND ROTATION CONTROL METHOD

(75) Inventor: Masashi Kisaka, Yokohama (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 159 days.

(21) Appl. No.: 10/405,306

(22) Filed: Apr. 1, 2003

(65) Prior Publication Data

US 2004/0004782 A1 Jan. 8, 2004

(30) Foreign Application Priority Data

Apr. 4, 2002 (JP) ........................................ 2002-102371

(51) Int. Cl.
*G11B 19/247* (2006.01)

(52) U.S. Cl. .................... 360/73.03; 318/254; 318/439; 388/801

(58) Field of Classification Search ............. 360/73.03, 360/69, 71; 318/138, 254, 439; 388/800, 388/801, 809

See application file for complete search history.

(56) References Cited

U.S. PATENT DOCUMENTS

| | | | | |
|---|---|---|---|---|
| 5,218,491 A | * | 6/1993 | Nishida et al. | .......... 360/73.03 |
| 5,631,999 A | * | 5/1997 | Dinsmore | .................... 388/805 |
| 5,636,193 A | * | 6/1997 | Ohmi | ...................... 360/73.03 |
| 5,796,546 A | * | 8/1998 | Sasamoto et al. | ......... 360/78.04 |
| 5,822,147 A | | 10/1998 | Kisaka | |
| 6,456,946 B1 | * | 9/2002 | O'Gorman | .................... 702/58 |
| 6,577,088 B1 | * | 6/2003 | Heydt et al. | ................. 318/254 |
| 6,754,151 B1 | * | 6/2004 | Watt | ........................ 369/47.36 |

OTHER PUBLICATIONS

Kisaka, Masashi and Ozawa, Yutaka, "Rejection of Repeatable Error with High Order Harmonics", Technical Report of IEICE, 1995, p. 53, C–361, IEICE, Japan.

* cited by examiner

*Primary Examiner*—David Hudspeth
*Assistant Examiner*—James L Habermehl
(74) *Attorney, Agent, or Firm*—Timothy N. Ellis

(57) ABSTRACT

The object is to raise controller gain while absorbing magnet position dispersion in a motor, and implement rotation control that is resistant to the influence of disturbance. There are provided a spindle motor 3 that performs rotational drive of a predetermined drive object, and a controller 121 that controls rotational drive of this spindle motor 3 by comparing a pulse time in rotational drive of this spindle motor 3 with a predetermined target time and performing feedback; and also provided is a peak filter 122 that compensates control by the controller 121 by varying the target time dynamically so as to suppress the rotation frequency and higher harmonic components thereof contained in the drive current waveform of the spindle motor 3.

23 Claims, 7 Drawing Sheets

[Figure 1]
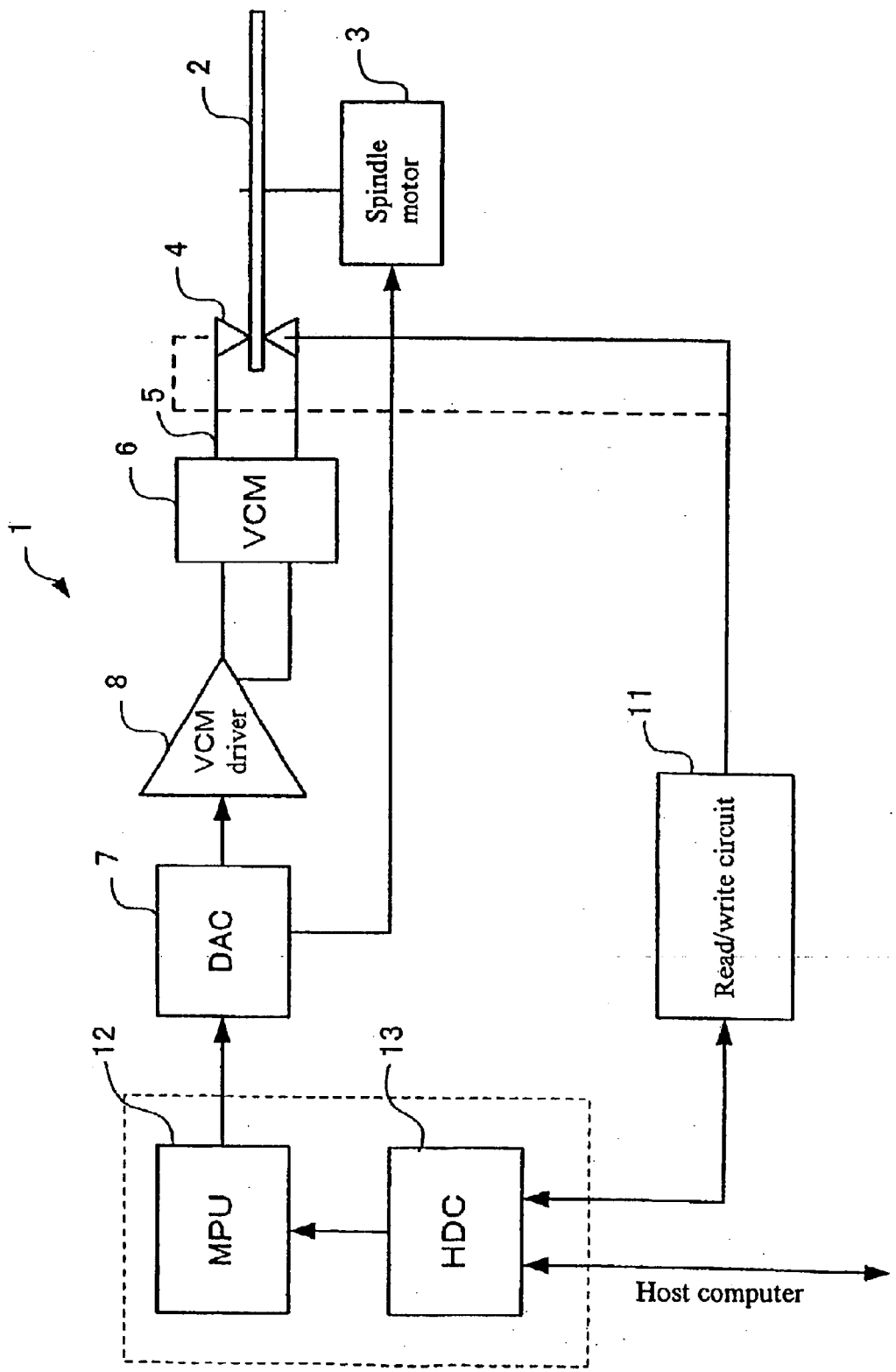

[Figure 2]
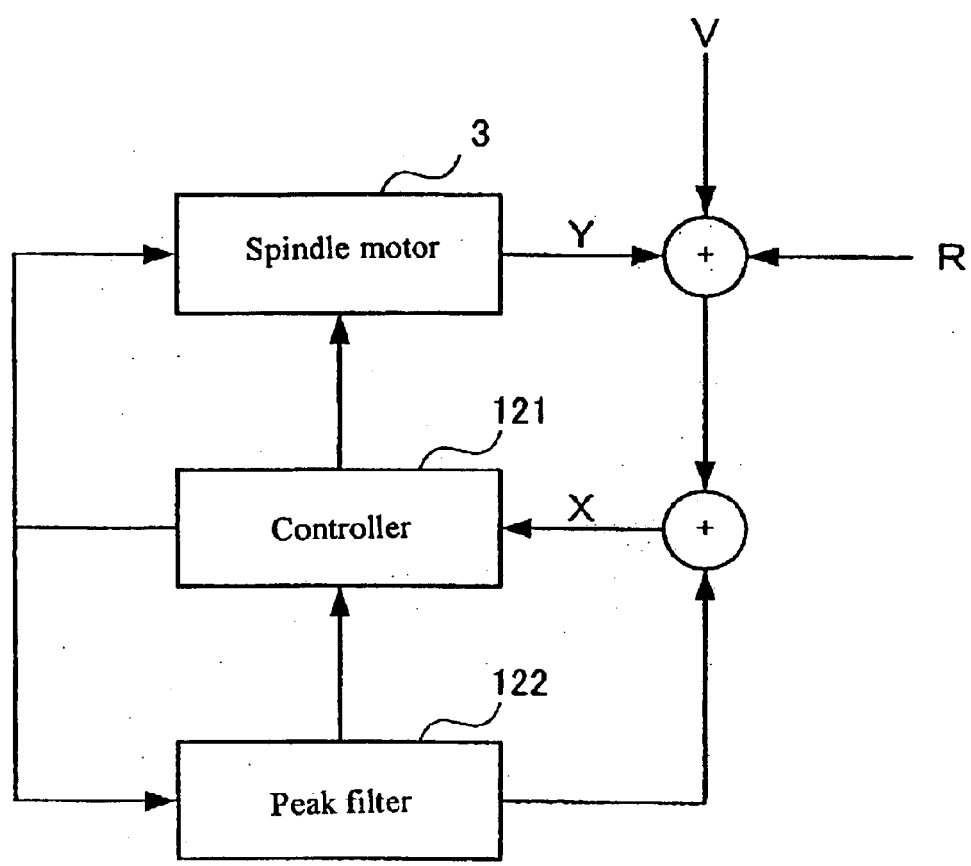

[Figure 3]
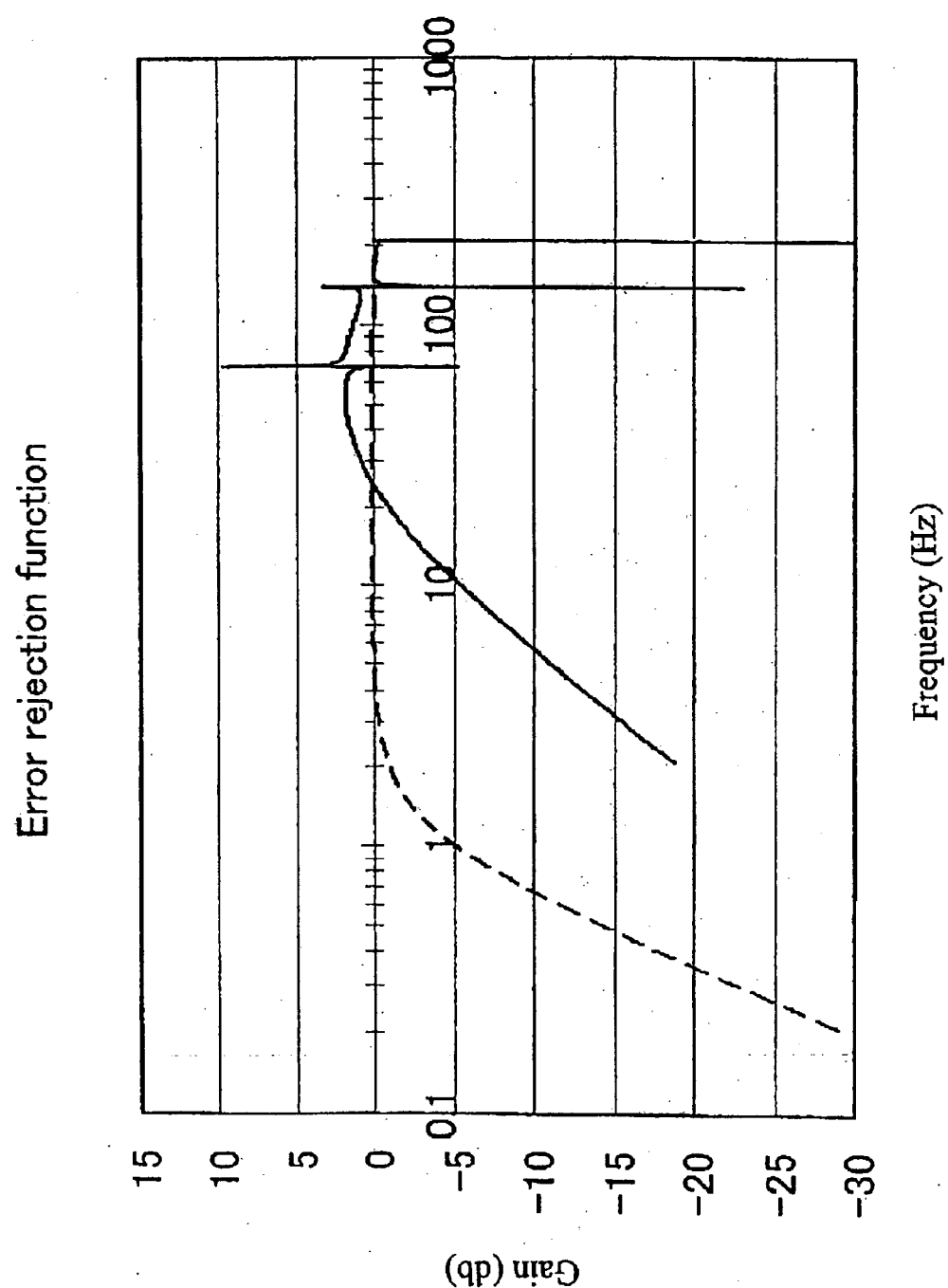

[Figure 4]
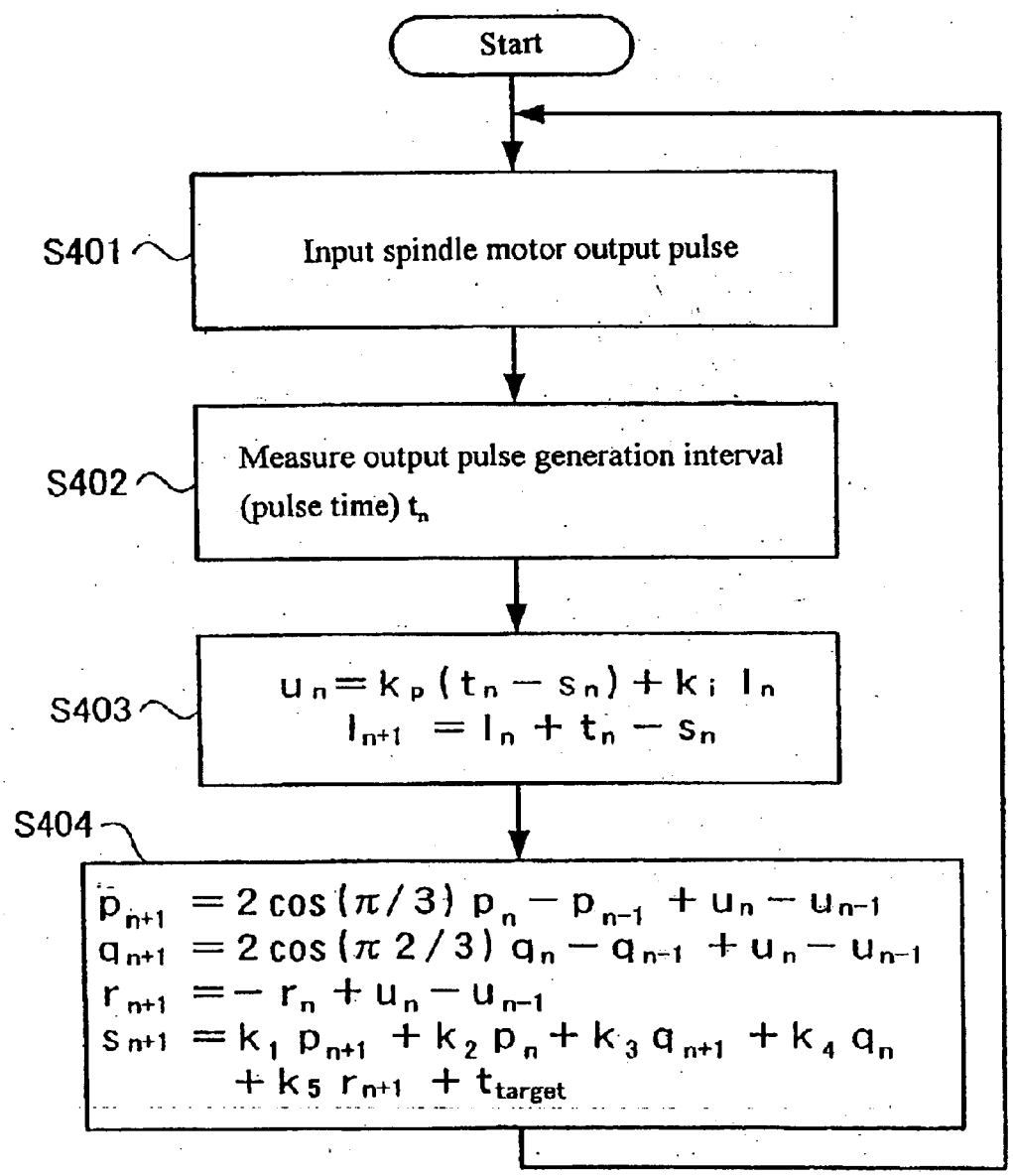

[Figure 5]
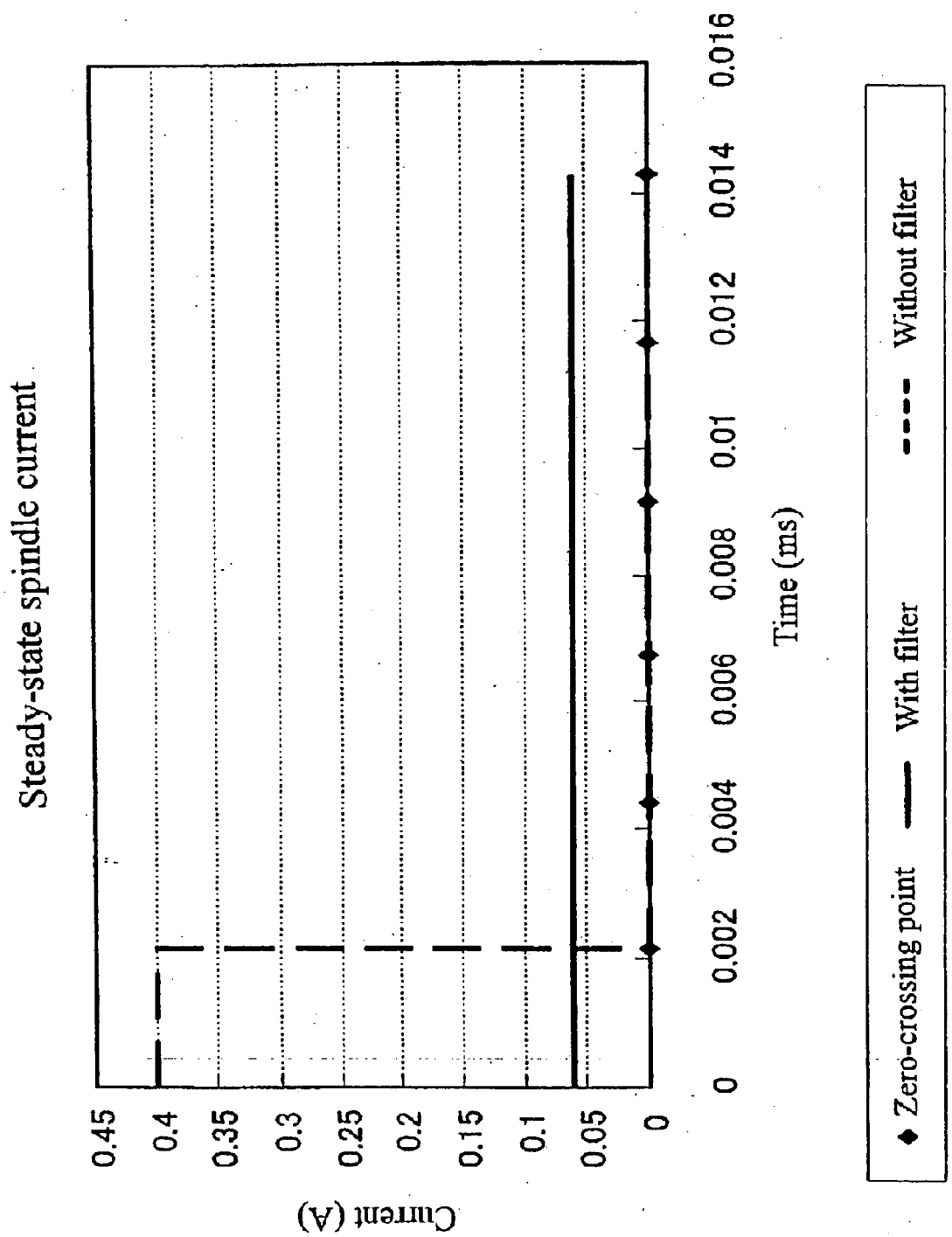

[Figure 6]
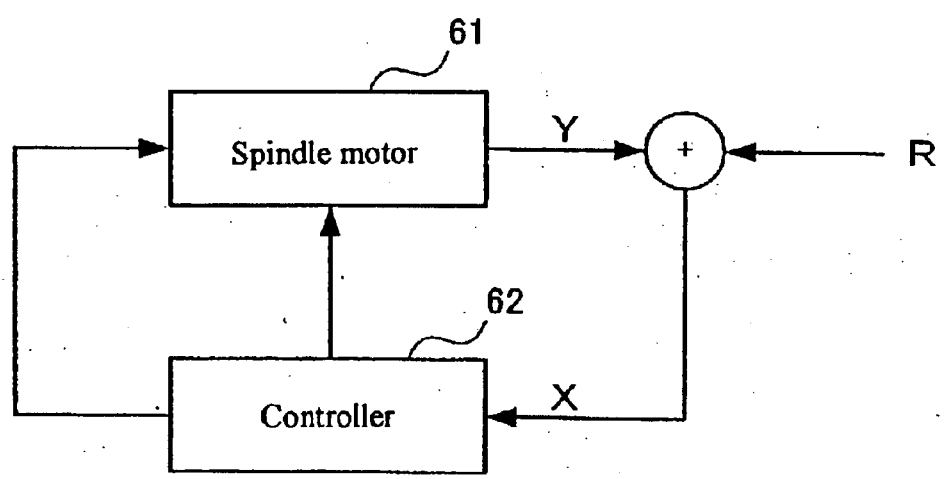

[Figure 7]
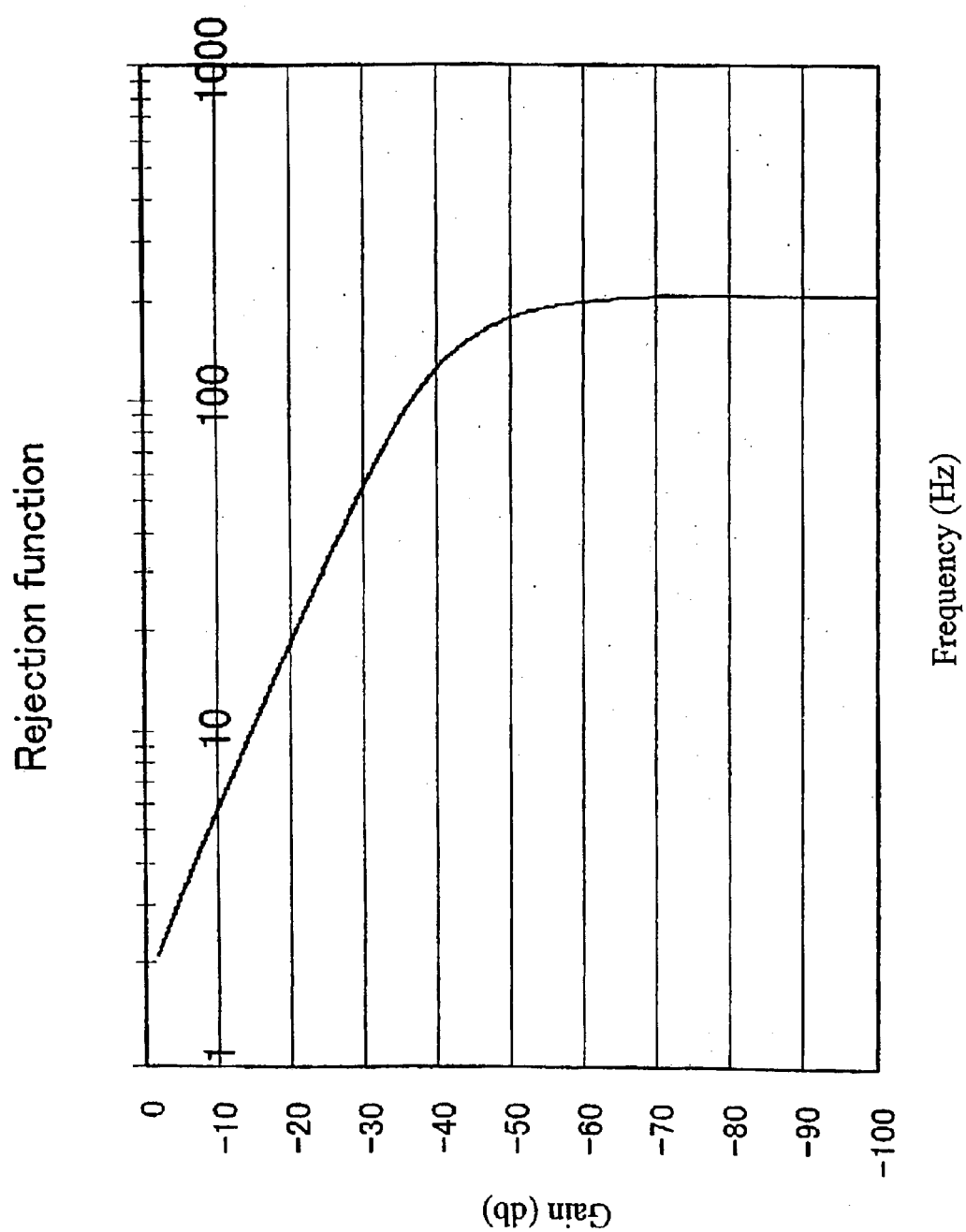

DATA STORAGE APPARATUS, ROTATION CONTROL APPARATUS, AND ROTATION CONTROL METHOD

BACKGROUND

1. Field of the Invention

The present invention relates to rotation control of a recording medium (disk) in a data storage apparatus such as a hard disk apparatus (drive).

2. Background Art

With a data storage apparatus (hereinafter referred to as "disk drive") that records data on a recording medium that rotates, such as a hard disk drive, it is vital to achieve highly precise rotation control. In particular, as the capacity of recording media increases and data is stored at a higher density, strong measures are necessary against oscillation of the direction of rotation due to external factors.

Conventionally, in the case of rotation control using a 3-phase DC motor, rotation is controlled by measuring the zero-crossing time at which the counter electromotive force induced in the phase intersects the reference voltage. For example, in the case of a motor that outputs a 6-cycle voltage waveform during one circuit (one revolution), a possible method is to have the controller measure the time of each cycle and compare it with a target time, and obtain a feedback value.

Since the counter electromotive force waveform is determined by the arrangement of magnets in the motor, the times of the six cycles in the voltage waveform are not the same even if the motor is rotating at constant speed. Thus, conventionally, measures are taken to reduce the controller gain and prevent an excessive change in the feedback values in each cycle so that the motor rotates with good precision even if there is dispersion of the six cycle times in the voltage waveform. For this reason, the open loop function zero-crossing frequency is approximately ⅕th of the rotation frequency of the motor.

FIG. 6 is a drawing showing the configuration of the rotation control apparatus of a spindle motor (DC motor) in a conventional disk drive.

As shown in FIG. 6, an output wave resulting from adding the influence R of field dispersion based on the position of magnets (hereinafter referred to simply as "magnet position dispersion") to output Y of a spindle motor 61 is input to a controller 62. The output of the controller 62 is then fed-back to the spindle motor 61.

Taking time as output, transfer function P(z) of the spindle system (spindle motor 61) in FIG. 6 is non-linear, but can be approximated by means of the equation in Numeric Reference 2 below.

$$P(z) = -\frac{1}{2}\frac{T^3}{\theta}\frac{(z+1)}{z(z-1)}\frac{k_t}{J} \qquad \text{[Numeric Reference 2]}$$

In the case of spindle motor 61 in which a 6-cycle voltage waveform is output during one cycle (one revolution), T is rotation time/6 and θ is 2π/6. Also, $k_t$ is the torque constant and J is inertia.

At this time, the influence of magnet positions on the rotation of the spindle motor 61 is expressed by the equations in Numeric Reference 3 below.

$$Y = F_{Phase} R \qquad \text{[Numeric Reference 3]}$$

$$F_{Phase} = \frac{PH}{1-PH}$$

In the equations in Numeric Reference 3 above, transfer function P(z) of the spindle motor 61 is denoted by P. H is transfer function H(z) of the controller 62, and is expressed by the equation in Numeric Reference 4 below.

$$H(z) = k_p + \frac{k_1}{z-1} \qquad \text{[Numeric Reference 4]}$$

It is assumed that the spindle motor 61 rotates at 4200 rpm and that 6 times are sampled in one revolution. At this time, the base frequency of magnet position influence R is 70 Hz. It is therefore necessary to select a controller 62 that will enable the 70 Hz component to be adequately suppressed. For example, in PI control, a controller 62 is designed for approximately −30 dB at 70 Hz, the magnet position influence R base frequency. FIG. 7 is a drawing showing the error function (Rejection function) in this case.

At this time, the following apply to the controller 62:

$u_n = k_p(t_n - t_{target}) + k_i I_n$ $I_{n+1} = I_n + t_n - t_{target}$ $k_i = 11.7$ $k_p = 1170$ where $u_n$ is the spindle current, $t_n$ is the measured time, and $t_{target}$ is the target time.

[Problems to be Solved by the Invention]

If controller gain is reduced in order to absorb magnet position dispersion in the spindle motor, feedback values from the controller do not change even if the voltage waveform of the motor is influenced by disturbance, and it is difficult to eliminate the influence of disturbance.

SUMMARY

It is thus an object of the present invention to raise controller gain while absorbing magnet position dispersion in a motor, and implement rotation control that is resistant to the influence of disturbance.

In order to achieve the above object, the present invention is implemented as a data storage apparatus configured as follows. Namely, this data storage apparatus comprises a recording medium that records data, drive means for performing rotational drive of this recording medium in order to perform reading/writing of data on the recording medium using a predetermined head, and rotation control means for controlling rotational drive of the recording medium by the drive means by comparing a pulse time in rotational drive of the drive means with a predetermined target time and performing feedback; and this rotation control means varies the target time dynamically so as to suppress the rotation frequency and higher harmonic components thereof contained in the drive current waveform of the drive means.

More specifically, this rotation control means calculates the above-described target time in the next control based on the drive current in the previous control. Still more specifically, this rotation control means calculates the target time in the next control using the difference between the drive current in the previous control and the drive current in the control further previous thereto.

Alternatively, this rotation control means controls rotational drive by the drive means using target times converged to a fixed value after rotational drive of the recording medium by the drive means has reached a steady state.

Another data storage apparatus according to the present invention comprises a recording medium that records data, a motor that performs rotational drive of the recording medium in order to perform reading/writing of data recorded on the recording medium using a predetermined head, a controller that controls rotational drive of the recording medium by the motor by comparing a pulse time in rotational drive of the motor with a predetermined target time and performing feedback, and a digital filter that supplies to the controller a signal for compensating for the influence of magnet position dispersion of the motor included in the rotation of the motor.

More specifically, this digital filter supplies to the above-described controller a signal that varies the target time dynamically in the next control by the controller based on a motor control signal by the controller. Moreover, this digital filter comprises a peak filter that has a peak at the rotation frequency and higher harmonics thereof contained in the drive current waveform of the motor, and for which gain is virtually 0 at other frequencies.

Alternatively, this digital filter is a filter whereby transfer function F(z) indicated by z conversion is expressed by the following equation when six pulse times are obtained when the motor rotates once:

$$F(z) = \left( \frac{(k_1 z + k_2) z}{z^2 - 2\cos(\frac{\pi}{2}) z + 1} + \frac{(k_3 z + k_4) z}{z^2 - 2\cos(2\frac{\pi}{2}) z + 1} + \frac{k_5 z}{z + 1} \right) \cdot \left(1 - \frac{1}{z}\right)$$ [Numeric Reference 5]

where $k_1$, $k_2$, $k_3$, $k_4$, and $k_5$ are constants.

Another aspect of the present invention that achieves the above object is implemented as a rotation control apparatus configured as follows. Namely, this rotation control apparatus comprises control means for controlling rotational drive of a motor by comparing a pulse time in rotational drive of the motor with a predetermined target time and performing feedback, and compensating means for compensating the control means so as to compensate for the influence of magnet position dispersion of the motor included in the rotation of the motor.

More specifically, this compensating means varies the target time dynamically in the next control by this controller based on controller output fed-back to the motor. Moreover, this compensating means is a digital filter that has a peak at the rotation frequency and higher harmonics thereof contained in the drive current waveform of the motor, and for which gain is virtually 0 at other frequencies.

Yet another aspect of the present invention that achieves the above object is implemented as the following kind of rotation control method that controls rotational drive of a motor. Namely, this method comprises a step of detecting motor output pulses and measuring the generation interval of these output pulses, a step of comparing the measured output pulse generation interval and a predetermined target time and calculating the motor drive current, and a step of calculating the above-described target time for comparing with the next output pulse generation interval when the next output pulse is detected, based on the calculated drive current.

Still more specifically, when six pulses are obtained when the motor rotates once, the step of calculating this target time calculates the above-described target time for the next comparison by means of the following equations:

$$p_{n+1} = 2\cos(\pi/3) p_n - p_{n-1} + u_n - u_{n-1}$$

$$q_{n+1} = 2\cos(\pi 2/3) q_n - q_{n-1} + u_n - u_{n-1}$$

$$r_{n+1} = -r_n + u_n - u_{n-1}$$

$$s_{n+1} = k_1 p_{n+1} + k_2 p_n + k_3 q_{n+1} + k_4 q_n + k_5 r_{n+1} + t_{target}$$

where $u_n$ and $u_{n-1}$ are the nth and (n−1)th drive currents respectively, $k_1$, $k_2$, $k_3$, $k_4$, and $k_5$ are constants, and $t_{target}$ is a preset target time reference value.

BRIEF DESCRIPTION OF THE DRAWINGS

FIG. 1 is a block diagram showing the main configuration of a hard disk apparatus according to this embodiment;

FIG. 2 is a drawing showing the configuration of the spindle motor rotation control apparatus in a hard disk apparatus 1 according to this embodiment;

FIG. 3 is a drawing showing the transfer function from disturbance V to controller input X in the control system shown in FIG. 2; and FIG. 4 is a flowchart explaining the operation of the MPU that implements a controller and peak filter according to this embodiment;

FIG. 5 is a drawing showing the steady-state spindle current in the control system shown in FIG. 2;

FIG. 6 is a drawing showing the configuration of the rotation control apparatus of a spindle motor in a conventional disk drive; and FIG. 7 is a drawing showing the error function in a controller that obtains approximately −30 dB gain at 70 Hz.

DETAILED DESCRIPTION

An embodiment of the present invention will now be described in detail taking a hard disk drive as an example.

In this embodiment, in a method whereby the pulse time proportional to the rotation time in which a number of times are obtained while the motor rotates once is compared with a target time, and feedback is performed, the target time is continually changed so that the rotation frequency and higher harmonic components thereof are not included in the drive current (so that the value of these components is 0). By this means, the influence of magnet position dispersion in the motor ceases to be fed-back, so that it becomes possible to increase controller gain, and rotation control that is resistant to (not susceptible to the influence of) disturbance is implemented.

FIG. 1 is a block diagram showing the main sections of a hard disk apparatus 1. The hard disk apparatus 1 is a data recording/playback apparatus in which a magnetic head 4 seeks on a magnetic disk 2 subjected to rotational drive by a spindle motor 3, and stops at a predetermined track (position) and writes data to the magnetic disk 2 or reads data written to the magnetic disk 2. One or a plurality of magnetic disks 2 are installed; FIG. 1 shows an example of a single magnetic disk 2.

When the hard disk apparatus 1 is operating, the magnetic disk 2 is subjected to rotational drive about the spindle axis of the spindle motor 3, and when the hard disk apparatus 1 is not operating, the magnetic disk 2 stops rotating (is stationary). Two magnetic heads 4 corresponding to the two sides of the magnetic disk 2 are supported at the tip of an actuator 5, and execute data reading and writing on the magnetic disk 2. The actuator 5 is driven by a voice coil motor (VCM) 6 controlled by an MPU (Micro Processing Unit) 12 via a digital/analog converter (DAC) 7 and voice coil motor (VCM) driver 8.

A read/write circuit 11 executes data read/write processing. That is to say, write data transferred from a host computer via an HDC (hard disk controller) 13 is converted to a write signal (current) and supplied to the magnetic head 4. Based on this write current, the magnetic head 4 executes a data write to the magnetic disk 2. On the other hand, a read signal (current) read from the magnetic disk 2 is converted to digital data and is output to the host computer via the HDC 13.

The HDC 13 has functions as an interface to the hard disk apparatus 1. One of these functions is to receive write data transferred from the host computer and transfer it to the read/write circuit 11. The HDC 13 also transfers read data transferred from the read/write circuit 11 to the host computer, and receives instruction commands, etc., from the host computer and transfers them to the MPU 12.

The MPU 12 handles control of the hard disk apparatus 1. As this function, in this embodiment the MPU 12 controls the spindle motor 3 and performs high-precision rotation control of the magnetic disk 2.

FIG. 2 is a drawing showing the configuration of the rotation control apparatus in a hard disk apparatus 1 according to this embodiment.

Referring to FIG. 2, a rotation control apparatus according to this embodiment comprises a spindle motor 3 as drive means, a controller 121 as rotation control means implemented by the MPU 12, and a peak filter (digital filter) 122. As shown in this drawing, spindle motor 3 output (output waveform) Y is added together with disturbance V and magnet position dispersion influence R, and the resulting output waveform is further added to the output signal from the peak filter 122, the compensating means, and the resulting signal is input to the controller 121, the control means. Then the controller 121 output (control signal) is fed-back to the spindle motor 3 and peak filter 122. The controller 121 output controls the spindle motor 3 via the DAC 7 (not shown in FIG. 2).

In the configuration shown in FIG. 2, spindle motor 3 transfer function P(z) is approximated by the equation in Numeric Reference 2 above, and the controller 121 transfer function H(z) is approximated by the equation in Numeric Reference 4 above. Also, peak filter 122 transfer function F(z) is expressed by the equation in Numeric Reference 6 below.

[Numeric Reference 6]
$$F(z) = \left(\frac{(k_1 z + k_2) z}{z^2 - 2\cos(\frac{\pi}{2})z + 1} + \frac{(k_3 z + k_4) z}{z^2 - 2\cos(2\frac{\pi}{2})z + 1} + \frac{k_5 z}{z+1}\right) \cdot \left(1 - \frac{1}{z}\right)$$

When the motor rotates at 4200 rpm and six times are sampled in one revolution, the basic frequency of magnet position influence R in this motor is 70 Hz. In this case, therefore, the peak filter 122 used in this embodiment is a filter that has peaks at the rotation frequency of the motor and higher harmonics thereof (in the present example, 70 Hz, 140 Hz, and 210 Hz), and for which gain is virtually 0 at other frequencies. Based on the equation in Numeric Reference 6 above, the following apply to the peak filter 122:

$p_{n+1} = 2\cos(\pi/3)p_n - p_{n-1} + u_n - u_{n-1}$ $q_{n+1} = 2\cos(\pi 2/3)q_n - q_{n-1} + u_n - u_{n-1}$ $r_{n+1} = -r_n + u_n - u_{n-1}$ $s_{n+1} = k_1 p_{n+1} + k_2 p_n + k_3 q_{n+1} + k_4 q_n + k_5 r_{n+1} + t_{target}$ $k_1 = -1.94328 \times 10^{-7}$ $k_2 = 3.88657 \times 10^{-7}$ $k_3 = -3.88657 \times 10^{-7}$ $k_4 = 1.94328 \times 10^{-7}$ $k_5 = 1.94328 \times 10^{-7}$ In the above equations, s is the target time, and p, q, and r are the peaks corresponding to the respective higher harmonics (omitting the respective subscripts), with p calculating the denominator of the first term of the equation in Numeric Reference 6, q calculating the denominator of the second term of the equation in Numeric Reference 6, and r calculating the denominator of the third term of the equation in Numeric Reference 6. As s is updated, controller 121 feedback, described next, is received, and the target time that is the next target is calculated.

In the calculations of p, q, and r, the reason for providing term $u_n - u_{n-1}$ and finding the difference in spindle current is in order to eliminate the direct current component of the spindle current from the calculation of target time s. By this means, it is possible to obtain the correct motor rotation speed.

Also, the following apply to the controller 121:

$u_n = k_p(t_n - s_n) + k_i I_n$ $I_{n+1} = I_n + t_n - s_n$ $k_i = 11.7$ $k_p = 11700$

To make a comparison with conventional controller 62, whereas target time $t_{target}$ was previously fixed, in this embodiment target time $s_n$ is updated as occasion demands by the peak filter 122.

In the above equations, the k coefficients ($k_1$ to $k_5$, $k_i$, $k_p$) are set taking account of the stability of the control system (rotation control apparatus) shown in FIG. 2. Matters regarding the stability of this system are included in the following documentation and in Japanese Patent Publication No. 3177120 (U.S. Pat. No. 5,822,147).

Documentation: Masashi Kisaka and Yutaka Ozawa, "Higher-Order Repetition Error Compensation Method", 1995 Technical Report of IEICE, C-361, 1995.

FIG. 3 is a drawing showing the transfer function (Error rejection function) from disturbance V to controller 121 input X in the control system shown in FIG. 2.

In FIG. 3, the transfer function in this embodiment is indicated by a solid line, and the transfer function in a conventional system that does not have a peak filter 122 is indicated by a dashed line. Comparing the two, it can be seen that, in a conventional control system, at a frequency of 2 Hz or above the gain value is close to 0 dB and disturbance cannot be suppressed, whereas in this embodiment disturbance can be suppressed up to a frequency of approximately 20 Hz. This is due to the fact that the coefficients ($k_i$, $k_p$) in the controller 121 are ten times the conventional values.

Also, referring to FIG. 3, after the transfer function in this embodiment exceeds 20 Hz, the gain value exceeds 0 dB, but there are peaks at the 70 Hz, 140 Hz, and 210 Hz positions, and the gain value is far less than 0 dB. Consequently, there is no influence of magnet positions in these higher harmonics, and it is possible to raise the gain of the controller 121 to a great extent, as described above.

FIG. 4 is a flowchart explaining the operation of the MPU 12 that implements the controller 121 and peak filter 122 in this embodiment.

As shown in FIG. 4, when a spindle motor 3 output pulse (output waveform) is input (Step 401), the MPU 12 measures the generation interval of this output pulse (pulse time) $t_n$ (Step 402).

Then the MPU 12 calculates the spindle current $u_n$ at the present time using the measured pulse time $t_n$ and transmits this to the DAC 7, and also calculates $I_{n+1}$ to be used in the calculation of spindle current $u_{n+1}$ at the time of the next pulse input (Step 403). In addition, the MPU 12 calculates target time $s_{n+1}$ to be used for calculating the next spindle current $u_n$ (Step 404).

Next, whether the peak filter 122 used in this embodiment compensates for the influence of magnet position dispersion correctly is shown.

FIG. 5 is a drawing showing the steady-state spindle current in the control system shown in FIG. 2.

In FIG. 5, it is assumed that it is desirable to obtain the result of passing a 60 mA current to the spindle motor 3 as a load current (spindle current). The spindle current obtained in this embodiment is indicated by a solid line, and the spindle current obtained in a conventional control system is indicated by a dashed line.

Here, the pulse time is measured six times in one revolution when the motor is rotating correctly, based on the zero-crossing time lag due to magnet position dispersion. It is assumed that the following pulse times (msec) are obtained in the predetermined measurements (in the case shown in the drawing).

0.002143
0.002262
0.002333
0.002429
0.0025
0.002619

In the case of a conventional control system with no peak filter 122, the above values are compared with a fixed value $t_{target}$. In this case, the 6th pulse time is long, and therefore rotation of the motor is determined to be slow at this point, and operation is repeated whereby in the next cycle a large current is passed first to increase motor rotation, and since a fast value (short pulse time) follows thereafter, a current is not passed. This means that fast rotating and slowly rotating places (wow and flutter) appear during one revolution.

In contrast, in this embodiment which includes a peak filter 122, target value $s_n$ varies so as to compensate for zero-crossing lag, and therefore it is possible to continue to pass a 60 mA spindle current, and steady rotation is achieved.

The above-described rotation control apparatus calculates the spindle current using the processing procedure shown in FIG. 4 each time a spindle motor 3 output pulse is input. However, after rotation of the spindle motor 3 reaches a steady state, the target times that should be updated converge to a fixed value. Thus, after spindle motor 3 rotation reaches a steady state, instead of the target time being calculated each time, the target time value calculated in the steady state is stored in memory, etc., and rotation control can be performed using the stored target value.

In the above example, rotation control of a spindle motor 3 used for disk rotation in a hard disk apparatus 1 is described by way of illustration, but it goes without saying that the present invention can also be generally used in rotation control for various kinds of motors requiring highly precise rotation, such as CD-ROM drives and so forth. In this case, the above-mentioned higher harmonic frequencies (70 Hz, 140 Hz, and 210 Hz) are values that apply when taking the example of a motor that rotates at 4200 rpm, and in actual systems suitable values will be selected based on the rotation speed and structure of various kinds of motor.

[Advantages of the Invention]

As described above, according to the present invention, it is possible to raise controller gain while absorbing magnet position dispersion in a motor, and implement rotation control that is resistant to the influence of disturbance.

[Description of Symbols]

1 . . . Hard disk apparatus
2 . . . Magnetic disk
3 . . . Spindle motor
4 . . . Magnetic head
5 . . . Actuator
6 . . . VCM (voice coil motor)
7 . . . DAC (digital/analog converter)
11 . . . Read/write circuit
12 . . . MPU
13 . . . HDC (hard disk controller)
121 . . . Controller
122 . . . Peak filter

What is claimed is:

1. An apparatus for controlling the rotational speed of a motor, comprising:
    a motor; and
    a processing system coupled to the motor, wherein the processing system is configured to perform the following operations:
        inputting a representation of a first output pulse and a representation of a successive second output pulse from the motor;
        measuring a first time interval between the first output pulse and the second output pulse;
        calculating a difference between the first measured time interval and a first target time;
        calculating a representation of a first motor drive current, wherein the first motor drive current is a function of the difference between the first measured time interval and the first target time; and
        calculating a second target time that is a function of the first motor drive current, wherein the second target time is designated $s_{n+1}$ and is calculated in accordance with the following equations:

$$p_{n+1} = 2\cos(\pi/3)p_n - p_{n-1} + u_n - u_{n-1}$$

$$q_{n+1} = 2\cos(\pi 2/3)q_n - q_{n-1} + u_n - u_{n-1}$$

$$r_{n+1} = -r_n + u_n - u_{n-1}$$

$$s_{n+1} = k_1 p_{n+1} + k_2 p_n + k_3 q_{n+1} + k_4 q_n + k_5 r_{n+1} + t_{target}.$$

2. The apparatus of claim 1 wherein the processing system comprises a controller and a filter.

3. The apparatus of claim 1 wherein the processing system is a micro processing unit.

4. The apparatus of claim 1, further comprising a data storage medium coupled to the motor.

5. The apparatus of claim 1, wherein the operations further comprise:
   inputting a representation of a third output pulse from the motor, wherein the third output pulse is successive to the second output pulse;
   measuring a second time interval between the second output pulse and the third output pulse;
   calculating a difference between the second measured time interval and the second target time; and
   calculating a representation of a second motor drive current, wherein the second motor drive current is a function of the difference between the second measured time interval and the second target time.

6. An apparatus for controlling the rotational speed of a recording medium, comprising:
   a recording medium;
   a motor coupled to the recording medium; and
   a processing system coupled to the motor, wherein the processing system is configured to perform the following operations:
      inputting a representation of a first output pulse and a representation of a successive second output pulse from the motor;
      measuring a first time interval between the first output pulse and the second output pulse;
      calculating a difference between the first measured time interval and a first target time;
      calculating a representation of a first motor drive current, wherein the first motor drive current is a function of a difference between the first measured time interval and the first target time; and
      calculating a second target time that is a function of the difference between the first motor drive current and an immediately preceding motor drive current.

7. The apparatus of claim 6, wherein the operations further comprise:
   inputting a representation of a third output pulse from the motor, wherein the third output pulse is successive to the second output pulse;
   measuring a second time interval between the second output pulse and the third output pulse;
   calculating a difference between the second measured time interval and the second target time;
   calculating a representation of a second motor drive current, wherein the second motor drive current is a function of the difference between the second measured time interval and the second target time;
   determining a difference between the second drive current and the first drive current; and
   calculating a third target time that is a function of the difference between the second drive current and the first drive current.

8. The apparatus of claim 7, wherein the operations further comprise storing a most recent target time and ceasing calculating target times, after the motor rotation reaches a steady state.

9. An apparatus for controlling the rotational speed of a motor, comprising:
   a motor; and
   a processing system coupled to the motor, wherein the processing system is configured to perform the following operations:
      determining if the rotation rate of the motor has reached a steady state;
      inputting a representation of a first output pulse and a representation of a successive second output pulse from the motor;
      measuring a first time interval between the first output pulse and the second output pulse;
      calculating a difference between the first measured time interval and a first target time;
      calculating a representation of a first motor drive current, wherein the first motor drive current is a function of the difference between the first measured time interval and the first target time;
      calculating a second target time that is a function of the first motor drive current;
      inputting a representation of a third output pulse from the motor that is successive to the second output pulse;
      measuring a second time interval between the second output pulse and the third output pulse; and
      if in the determining operation it was determined that the rotation rate of the motor had reached a steady state, then the operations further comprise:
         calculating a difference between the second measured time interval and the first target time; and
         calculating a representation of a second motor drive current, wherein the second motor drive current is a function of the difference between the second measured time interval and the first target time;
      if in the determining operation it was determined that the rotation rate of the motor had not reached a steady state, then the operations further comprise:
         calculating a second target time that is a function of the first motor drive current;
         calculating a difference between the second measured time interval and the second target time; and
         calculating a representation of the second motor drive current, wherein the second motor drive current is a function of the difference between the second measured time interval and the second target time.

10. A data storage apparatus, comprising:
   a recording medium;
   a motor having an input and an output, wherein the motor is coupled to the recording medium for rotating the recording medium;
   a controller having an input and an output, wherein the input of the controller is coupled to the output of the motor to receive a signal that includes a disturbance signal and a magnet position dispersion influence signal, and wherein the output of the controller is coupled to the input of the motor for controlling the rate of rotation of the recording medium; and
   a filter having an input and an output, wherein the input of the filter is coupled to the output of the controller, and wherein the output of the filter is coupled to the input of the controller, wherein the filter is configured to supply a signal to the controller to compensate for dispersion of magnet positions of the motor.

11. The apparatus of claim 10, wherein the signal supplied by the filter to the controller dynamically varies a target time to suppress the rotation frequency and some harmonics of the rotation frequency in a motor drive current waveform.

12. An apparatus for controlling the rotational speed of a motor, comprising:
- a motor having an input and an output;
- a peak filter having an input and an output;
- a controller having an input and an output, wherein the input of the controller is coupled to the output of the motor for receiving a signal that includes a disturbance signal and a magnet position dispersion influence signal, and wherein the input of the controller is also coupled to the output of the peak filter, and wherein the output of the controller is coupled to the input of the motor and the input of the peak filter; and
- wherein the peak filter and the controller are configured to cooperatively perform the following operations:
  - inputting a representation of a first output pulse and a representation of a successive second output pulse from the motor;
  - measuring a first time interval between the first output pulse and the second output pulse;
  - calculating a difference between the first measured time interval and a first target time;
  - calculating a representation of a first motor drive current, wherein the first motor drive current is a function of the difference between the first measured time interval and the first target time; and
  - calculating a second target time that is a function of the first motor drive current.

13. The apparatus of claim 12, wherein the peak filter is configured to compensate for zero-crossing lag.

14. The apparatus of claim 12, wherein the peak filter has a peak at a motor rotation frequency and at some harmonics of the motor rotation frequency.

15. The apparatus of claim 12, wherein the transfer function of the peak filter is expressed by the following equation:

$$F(z) = \left( \frac{(k_1 z + k_2)z}{z^2 - 2\cos(\frac{\pi}{2})z + 1} + \frac{(k_3 z + k_4)z}{z^2 - 2\cos(2\frac{\pi}{2})z + 1} + \frac{k_5 z}{z+1} \right) \cdot \left(1 - \frac{1}{z}\right)$$

16. The apparatus of claim 12, further comprising an adder having a first input, a second input, and an output, wherein the first input of the adder is coupled to the output of the motor for receiving the signal that includes the disturbance signal and the magnet position dispersion influence signal, and wherein the second input of the adder is coupled to the output of the peak filter, and wherein the output of the adder is coupled to the input of the controller.

17. A data storage apparatus, comprising:
- a magnetic head;
- an actuator coupled to the magnetic head for moving the magnetic head;
- a voice coil motor coupled to the actuator for moving the actuator;
- a voice coil motor driver coupled to the voice coil motor;
- a digital to analog converter coupled to the voice coil motor driver;
- a spindle motor coupled to the digital to analog converter;
- a hard disk coupled to the spindle motor;
- a micro processing unit coupled to the digital to analog converter;
- a hard disk controller coupled to the micro processing unit; and
- a read/write circuit coupled to the hard disk controller and to the magnetic head; and wherein the micro processing unit is configured to perform the following operations:
- inputting a representation of a first output pulse and a representation of a successive second output pulse from the motor;
- measuring a first time interval between the first output pulse and the second output pulse;
- calculating a difference between the first measured time interval and a first target time;
- calculating a representation of a first motor drive current, wherein the first motor drive current is a function of the difference between the first measured time interval and the first target time;
- presenting the representation of the first motor drive current to the digital to analog converter; and
- calculating a second target time that is a function of the first motor drive current, wherein the second target time is designated $s_{n+1}$ and is calculated in accordance with the following equations:

$$p_{n+1} = 2 \cos(\pi/3) p_n - p_{n-1} + u_n - u_{n-1}$$

$$q_{n+1} = 2 \cos(\pi 2/3) q_n - q_{n-1} + u_n - u_{n-1}$$

$$r_{n+1} = -r_n + u_n - u_{n-1}$$

$$s_{n+1} = k_1 p_{n+1} + k_2 p_n + k_3 q_{n+1} + k_4 q_n + k_5 r_{n+1} + t_{target}.$$

18. An apparatus for rotating a motor at a constant rate, comprising:
- means for detecting a first output pulse and a successive second output pulse from the motor;
- means for measuring a first time interval between the first output pulse and the second output pulse;
- means for calculating a difference between the first measured time interval and a first target time;
- means for calculating a representation of a first motor drive current, wherein the first motor drive current is a function of the difference between the first measured time interval and the first target time;
- means for calculating a second target time that is a function of the first motor drive current;
- means for detecting a third output pulse from the motor that is successive to the second output pulse;
- means for measuring a second time interval between the second output pulse and the third output pulse;
- means for calculating a difference between the second measured time interval and the second target time; and
- means for calculating a representation of a second motor drive current, wherein the second motor drive current is a function of the difference between the second measured time interval and the second target time.

19. A method for controlling the rotational speed of a motor, comprising:
- adding an output signal from a motor to an output signal from a peak filter to produce a controller input signal; wherein the output signal from the motor includes a disturbance signal and a magnet position dispersion influence signal, and wherein the output signal from the peak filter compensates for the magnet position dispersion influence signal;
- inputting the controller input signal to a controller;
- producing a controller output signal; and
- applying the controller output signal to an input to the motor and to an input to the peak filter.

20. A method for controlling a motor, comprising:
  detecting a first output pulse and a successive second output pulse from the motor;
  measuring a first time interval between the first output pulse and the second output pulse;
  calculating a difference between the first measured time interval and a first target time;
  calculating a representation of a first motor drive current, wherein the first motor drive current is a function of the difference between the first measured time interval and the first target time; and
  calculating a second target time that is a function of the first motor drive current, wherein the second target time is designated $s_{n+1}$ and is calculated in accordance with the following equations:

$$p_{n+1}=2\cos(\pi/3)p_n-p_{n-1}+u_n-u_{n-1}$$

$$q_{n+1}=2\cos(\pi^{2/3})q_n-q_{n-1}+u_n-u_{n-1}$$

$$r_{n+1}=-r_n+u_n-u_{n-1}$$

$$s_{n+1}=k_1p_{n+1}+k_2p_n+k_3q_{n+1}+k_4q_n+k_5r_{n+1}+t_{target}.$$

21. The method of claim 20, further comprising:
  detecting a third output pulse from the motor that is successive to the second output pulse;
  measuring a second time interval between the second output pulse and the third output pulse;
  calculating a difference between the second measured time interval and the second target time; and
  calculating a representation of a second motor drive current, wherein the second motor drive current is a function of the difference between the second measured time interval and the second target time.

22. A method for rotating a motor at a constant rate, comprising:
  detecting a first output pulse and a successive second output pulse from the motor;
  measuring a first time interval between the first output pulse and the second output pulse;
  calculating a difference between the first measured time interval and a first target time;
  calculating a representation of a first motor drive current, wherein the first motor drive current is a function of the difference between the first measured time interval and the first target time;
  calculating a second target time that is a function of the difference between the first motor drive current and an immediately preceding drive current;
  detecting a third output pulse from the motor that is successive to the second output pulse;
  measuring a second time interval between the second output pulse and the third output pulse;
  calculating a difference between the second measured time interval and the second target time;
  calculating a representation of a second motor drive current, wherein the second motor drive current is a function of the difference between the second measured time interval and the second target time;
  determining a difference between the first drive current and the second drive current; and
  calculating a third target time that is a function of the difference between the second drive current and the first drive current.

23. A method for controlling the rate of rotation of a motor, comprising the following operations:
  determining if the rotation rate of the motor has reached a steady state;
  detecting a first output pulse and a successive second output pulse from the motor;
  measuring a first time interval between the first output pulse and the second output pulse;
  calculating a difference between the first measured time interval and a first target time;
  calculating a representation of a first motor drive current, wherein the first motor drive current is a function of the difference between the first measured time interval and the first target time;
  calculating a second target time that is a function of the first motor drive current;
  detecting a third output pulse from the motor that is successive to the second output pulse;
  measuring a second time interval between the second output pulse and the third output pulse; and
  if in the determining operation it was determined that the rotation rate of the motor had reached a steady state, then the operations further comprise:
    calculating a difference between the second measured time interval and the first target time; and
    calculating a representation of a second motor drive current, wherein the second motor drive current is a function of the difference between the second measured time interval and the first target time;
  if in the determining operation it was determined that the rotation rate of the motor had not reached a steady state, then the operations further comprise:
    calculating a second target time that is a function of the first motor drive current;
    calculating a difference between the second measured time interval and a second target time; and
    calculating a representation of the second motor drive current, wherein the second motor drive current is a function of the difference between the second measured time interval and the second target time.

* * * * *